US010523831B2

(12) United States Patent
Nakamura

(10) Patent No.: US 10,523,831 B2
(45) Date of Patent: Dec. 31, 2019

(54) IMAGE READING APPARATUS

(71) Applicant: SEIKO EPSON CORPORATION, Tokyo (JP)

(72) Inventor: Kiyotaka Nakamura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 15 days.

(21) Appl. No.: 15/667,300

(22) Filed: Aug. 2, 2017

(65) Prior Publication Data

US 2018/0041651 A1 Feb. 8, 2018

(30) Foreign Application Priority Data

Aug. 5, 2016 (JP) .................................. 2016-154597

(51) Int. Cl.
*H04N 1/04* (2006.01)
*H04N 1/00* (2006.01)

(52) U.S. Cl.
CPC ..... *H04N 1/00588* (2013.01); *H04N 1/00726* (2013.01); *H04N 1/00729* (2013.01); *H04N 1/00779* (2013.01); *H04N 2201/0081* (2013.01)

(58) Field of Classification Search
CPC ........... H04N 1/00588; H04N 1/00726; H04N 1/00729; H04N 1/00779; H04N 2201/0081
USPC ................................................. 358/498, 496
See application file for complete search history.

(56) References Cited

U.S. PATENT DOCUMENTS

| | | | | |
|---|---|---|---|---|
| 4,920,384 A | * | 4/1990 | Okamoto | G03G 15/5095 399/370 |
| 8,705,150 B2 | * | 4/2014 | Shirai | H04N 1/00596 358/474 |
| 9,674,389 B2 | * | 6/2017 | Kanaya | B65H 7/14 |
| 2003/0047609 A1 | * | 3/2003 | Endo | H04N 1/00588 235/454 |
| 2003/0112478 A1 | * | 6/2003 | Chang | H04N 1/1017 358/498 |
| 2004/0218230 A1 | * | 11/2004 | Furihata | G03G 15/60 358/474 |
| 2007/0002401 A1 | * | 1/2007 | Park | H04N 1/12 358/498 |
| 2008/0130070 A1 | * | 6/2008 | Walker | H04N 1/00326 358/496 |
| 2009/0027738 A1 | * | 1/2009 | Kim | H04N 1/1215 358/474 |
| 2009/0109500 A1 | * | 4/2009 | Hasegawa | H04N 1/00681 358/474 |

(Continued)

FOREIGN PATENT DOCUMENTS

JP 2007153580 A * 6/2007
JP 2012-100115 A 5/2012

*Primary Examiner* — Cheukfan Lee
(74) *Attorney, Agent, or Firm* — Workman Nydegger

(57) ABSTRACT

A lower read sensor is configured such that a lower read surface of the lower read sensor can be switched between a forward position in which the lower read surface is moved toward an upper read surface of an upper read sensor and a rearward position in which the lower read surface is moved away from the upper read surface farther than the forward position, and a controller switches the lower read sensor to the rearward position to transport a first medium having a predetermined stiffness and switches the lower read sensor to the forward position to transport a second medium having a stiffness lower than that of the first medium.

12 Claims, 10 Drawing Sheets

(56) References Cited

U.S. PATENT DOCUMENTS

| | | | |
|---|---|---|---|
| 2012/0013955 A1* | 1/2012 | Ikeda | H04N 1/203 |
| | | | 358/461 |
| 2012/0105925 A1 | 5/2012 | Shirai et al. | |
| 2013/0063747 A1* | 3/2013 | Sugimura | H04N 1/00424 |
| | | | 358/1.13 |
| 2013/0292899 A1* | 11/2013 | Mattern | B65H 7/02 |
| | | | 271/258.01 |
| 2014/0071503 A1* | 3/2014 | Mukai | H04N 1/00604 |
| | | | 358/498 |
| 2014/0079460 A1* | 3/2014 | Kanaya | B65H 7/14 |
| | | | 400/583 |
| 2014/0139896 A1* | 5/2014 | Osakabe | H04N 1/00567 |
| | | | 358/498 |

\* cited by examiner

IMAGE READING APPARATUS

BACKGROUND

1. Technical Field

The present invention relates to an image reading apparatus that reads images of documents.

2. Related Art

A certain type of scanner, which is an example of an image reading apparatus, includes an auto document feeder (ADF) for automatically feeding and reading a plurality documents (for example, see JP-A-2012-100115). The documents are transported toward a read section by the ADF. In such a scanner, in an area of the transport path where the transport path faces the read section, the transport path is narrowed to enable each transported medium (document) to come into close contact with the read section thereby the read section can read the documents with high accuracy. The transport path in JP-A-2012-100115 is defined by the image reading units 13 and 14 that are disposed vertically.

When a document is transported toward the read section, in the area that faces the read section in the transport path, the document may be pressed against the lower surface of the transport path to stabilize the orientation of the document in the area facing the read section. In such a case, in the narrow transport path in the area facing the read section, if a medium, which is the document, which has a high stiffness is transported, the medium may be caught on the transport path and its transport resistance may increase.

In JP-A-2012-100115, the space between the read surfaces of the image reading units 13 and 14, which are disposed vertically, is defined such that a thin medium M1 can pass therebetween and the read surfaces are urged by the elastic members 132 and 142 respectively such that the read surfaces approach each other (see FIG. 5 in JP-A-2012-100115). When a thick medium M2 is transported, the thick medium M2 passes between the read surfaces of the image reading units 13 and 14, so that the image reading units 13 and 14 are moved in directions the units 13 and 14 are separated from each other against the urging force of the elastic members 132 and 142. Such a structure produces a high transport resistance in transporting the thick medium M2.

SUMMARY

An advantage of some aspects of the invention is that there is provided an image reading apparatus capable of appropriately transporting a document toward an area that faces a read section even if the stiffness of the document is high, and thereby achieving high reading accuracy in the read section.

To solve the above-mentioned problems, an image reading apparatus according to a first aspect of the invention includes a transport path on which a medium is to be transported, a transport section configured to transport the medium while pressing the medium against a lower surface of the transport path, an upper read section disposed on a downstream side of the transport section in the transport direction, the upper read section having an upper read surface that is a part of an upper surface of the transport path and being configured to read an image of a first side of the medium being transported, the first side facing the upper read surface, a lower read section disposed on an opposite side of the transport path from the upper read section, the lower read section having a lower read surface that is a part of a lower surface of the transport path and being configured to read an image of a second side of the medium being transported, the second side facing the lower read surface, in which the lower read section can be switched between a forward position in which the lower read surface is moved toward the upper read surface and a rearward position in which the lower read surface is moved away from the upper read surface farther than the forward position, and a controller configured to control the position of the lower read section, in which the controller switches the lower read section to the rearward position to transport a first medium having a predetermined stiffness as the medium and switches the lower read section to the forward position to transport a second medium having a stiffness lower than that of the first medium as the medium.

According to this aspect, a controller configured to control the position of the lower read section switches the lower read section to the rearward position to transport a first medium having a predetermined stiffness. Consequently, when a first medium having a predetermined high stiffness is transported by the transport section while being pressed against the lower surface of the transport path, that is, the lower read surface of the lower read section, the risk of the first medium being caught by the lower read surface of the lower read section can be reduced and the increase in the transport resistance of the first medium to the lower read surface can be reduced. When a second medium having a stiffness lower than that of the first medium is transported as the medium, the controller switches the lower read section to the forward position. Consequently, when transporting the second medium which is less likely to be caught on the lower read surface while being pressed against the lower read surface, the space between the upper read surface and the lower read surface can be narrowed. Accordingly, the upper read surface and the first side of the medium (the second medium) and the lower read surface and the second side of the medium can be further narrowed respectively, and thereby the reading accuracy can be increased.

It is preferable that the image reading apparatus include, in the first aspect, a medium determination section configured to determine whether the medium being transported is the first medium or the second medium.

In this image reading apparatus, by the medium determination section, whether the medium being transported is the first medium or the second medium is detected, and in accordance with the determination result, the position of the lower read section can be controlled.

It is preferable that the first medium be a card-size medium.

With this image reading apparatus, when the first medium is a card-size medium, an operational advantage similar to that in the above-described image reading apparatus can be achieved.

It is preferable that the medium determination section include a first sensor disposed, in the transport path, inside a transport area in which the card-size medium is to be transported in the width direction that intersects the transport direction of the medium and a second sensor disposed, in the transport path, outside the transport area in which the card-size medium is to be transported in the width direction that intersects the transport direction of the medium. The medium determination section determines that the medium is the first medium when the medium being transported is detected by the first sensor and not detected by the second sensor and determines that the medium is the second medium in other cases.

In this image reading apparatus, in the transport path, by using a first sensor disposed inside a transport area in which the card-size medium is to be transported in the width direction that intersects the transport direction of the medium and a second sensor disposed outside the transport area in which the card-size medium is to be transported in the width direction that intersects the transport direction of the medium, whether the medium being transported is the first medium or the second medium is detected. Consequently, whether the medium being transported is the first medium or the second medium can be determined reliably.

It is preferable that the first sensor be disposed inside the transport area in the width direction such that a long side of the card-size medium is to be transported along the transport direction, and the second sensor be disposed outside the transport area in the width direction such that the long side of the card-size medium is to be transported along the transport direction.

In this image reading apparatus, when the card-size medium is transported with its long side along the transport direction, the first medium and the second medium can be distinguished and detected.

It is preferable that the first sensor be disposed inside the transport area in the width direction such that a long side of the card-size medium is to be transported along the transport direction, and the second sensor be disposed outside the transport area in the width direction such that a short side of the card-size medium is to be transported along the transport direction.

In this image reading apparatus, in both of the case in which the card-size medium is transported as the first medium with its long side along the transport direction and the case in which the first medium is transported with its short side along the transport direction, the first medium and the second medium can be distinguished and detected.

It is preferable that at least one of the first sensor and the second sensor be an ultrasonic sensor.

In this image reading apparatus, by using an ultrasonic sensor as at least one of the first sensor and the second sensor, an operational advantage similar to that in the above-described image reading apparatus can be achieved. Furthermore, a multi-sheet feed of the media can also be detected.

It is preferable that the image reading apparatus further include a position switching mechanism section configured to switch the positions of the lower read section. The position switching mechanism section may include a drive source and a cam section configured to transform the driving force of the drive source into forward or rearward motion of the lower read section.

In this image reading apparatus, the structure can be simplified and the switching of the lower read section can be performed.

It is preferable that the controller be capable of controlling the position of the lower read section in accordance with the type of medium that has been set in a driver.

With this image reading apparatus, the position of the lower read section can be controlled in accordance with the type of medium that has been set in a driver.

It is preferable that the controller be capable of controlling the position of the lower read section in accordance with the type of medium that has been set in a driver and control the position of the lower read section in accordance with a determination result by the medium determination section if the type of medium that has been set in the driver and the type of medium determined by the medium determination section are different.

In this image reading apparatus, if the type of medium that has been set in the driver and the type of medium determined by the medium determination section are different, in accordance with the determination by the medium determination section, the controller controls the position of the lower read section. Consequently, if a wrong setting that has been made by the user, the controller prioritizes the determination result by the medium determination section and controls the medium being transported.

It is preferable that the image reading apparatus include, in the first aspect, a lower unit including the lower read section and an upper unit including the upper read section, the upper unit being configured to be opened or closed with respect to the lower unit. When the upper unit is opened, the lower read section can be switched to a second rearward position in which the lower read section is further moved rearward than the rearward position.

With this image reading apparatus, the image reading apparatus can prevent a user from touching the lower read surface of the lower read section or foreign matter from coming into contact with the lower read surface when the upper unit is opened for maintenance or other operations.

It is preferable that the upper read section be able to be moved toward or away from the lower read section and include an urging section configured to urge the upper read section toward the lower read section. The urging section may be configured such that the urging force can be adjusted by the controller, and the controller that adjusts the urging force of the urging section may set the urging force of the urging section to a large force to transport the first medium as the medium and set the urging force of the urging section to an urging force smaller than that for transporting the first medium to transport the second medium as the medium.

While the first medium having a high stiffness is being transported, for example, the first medium may come into contact with the upper read section and may move the upper read section. The movement of the upper read section during the operation of reading the document decreases the read image quality.

In this image reading apparatus, to transport the first medium, the urging force of the urging member may be set to a large urging force to reduce the risk of the upper read section moving due to the contact of the first medium.

On the other hand, the second medium that has a stiffness lower than that of the first medium less frequently moves the upper read section even if the second medium comes into contact with the upper read section during the transport. Consequently, to transport the second medium as the medium, the urging force of the urging section may be set to an urging force smaller than that for transporting the first medium. This adjustment reduces the transport load in transporting the second medium that has the stiffness lower than that of the first medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

First, an image reading apparatus according to an embodiment of the invention will be briefly described. In this embodiment, as an example of the image reading apparatus, a document scanner (hereinafter, referred to simply as a scanner 1) that can scan at least one of the front surface and back surface of a medium will be described.

Figure 1:
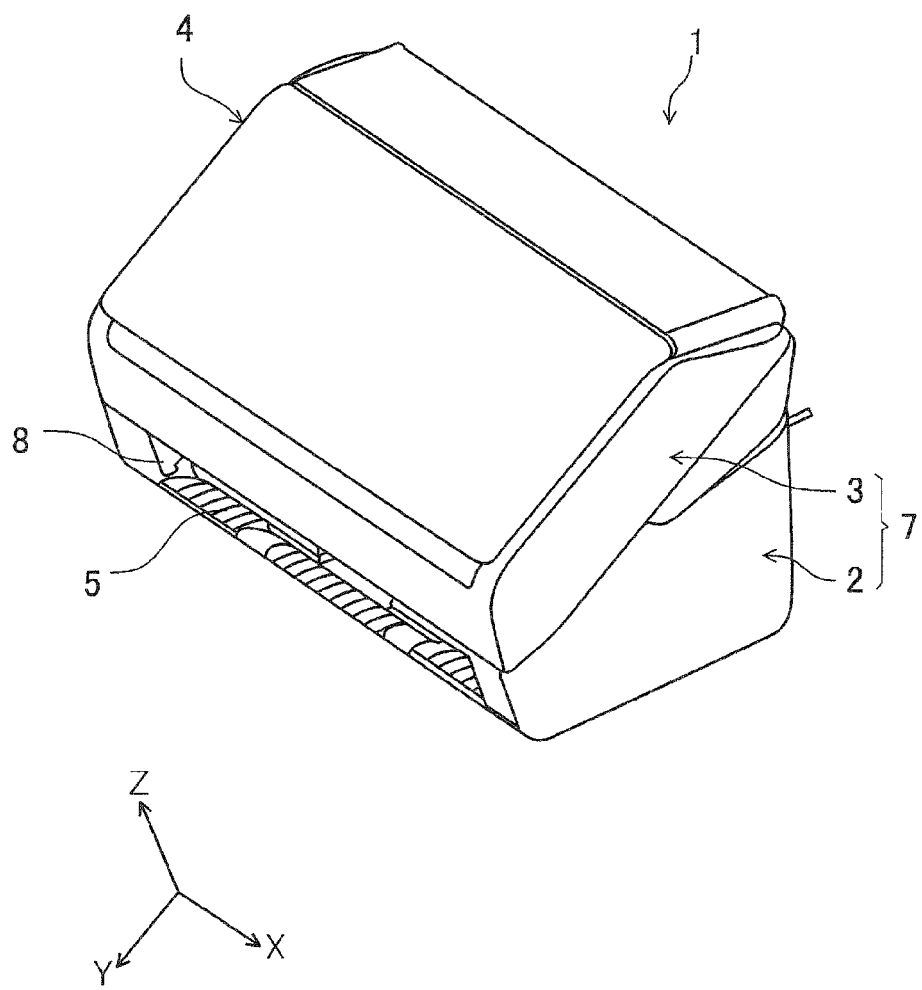
FIG. 1 is an external perspective view of a scanner according to an embodiment of the invention.
Figure 2:
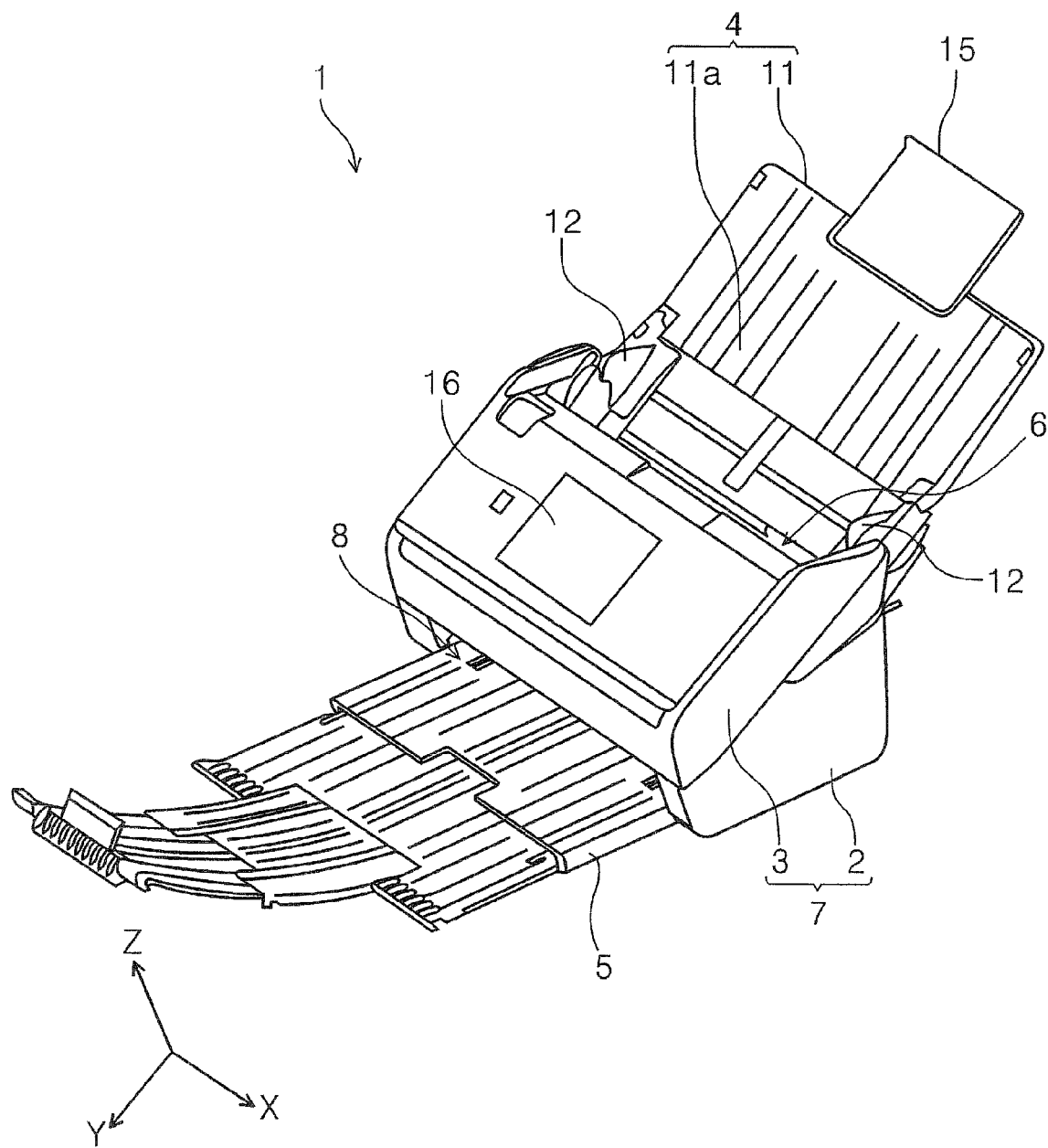
FIG. 2 is a perspective view of the scanner according to the embodiment of the invention in which an opening/closing body is opened and a discharge tray is extended.
Figure 3:
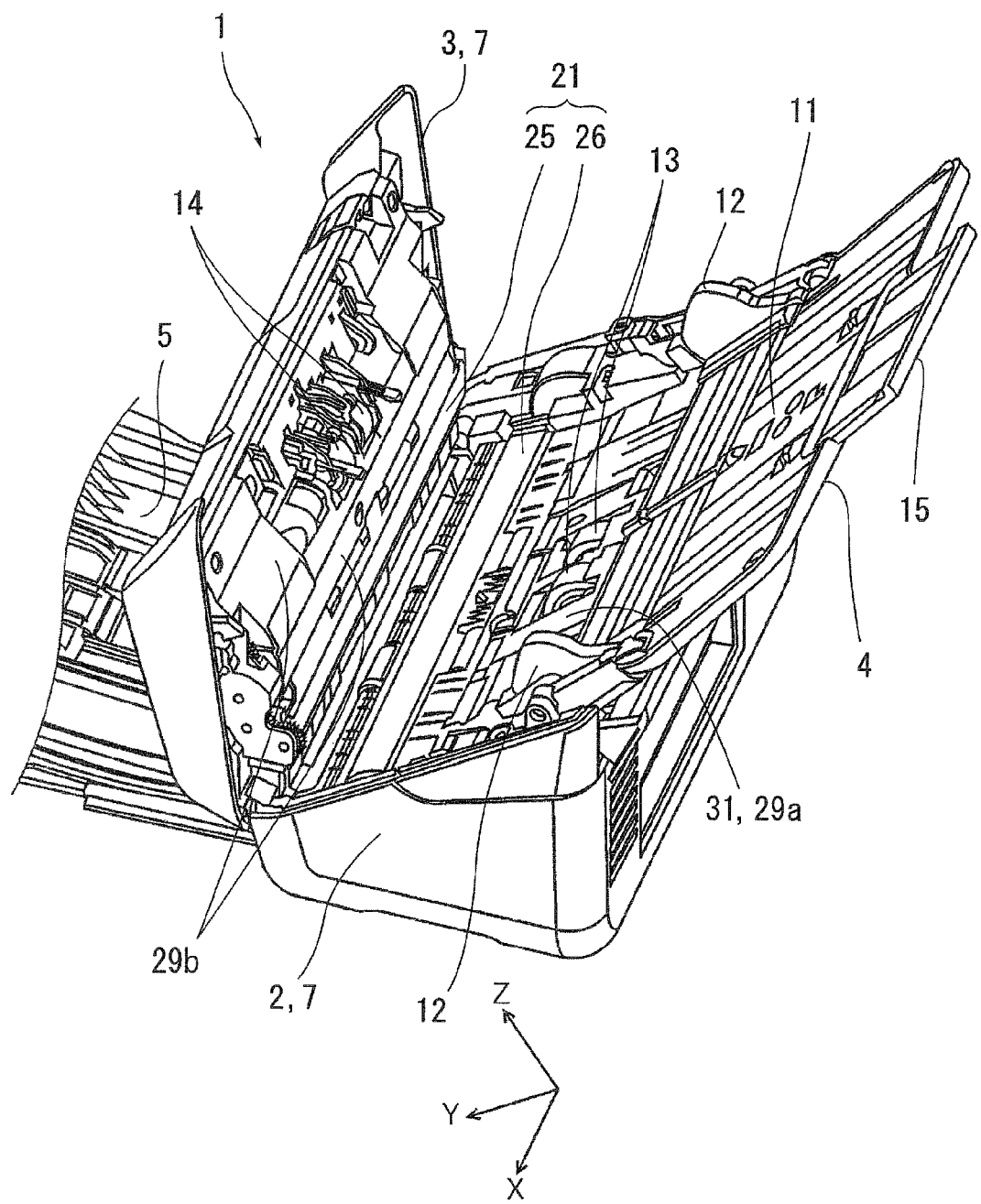
FIG. 3 is a perspective view of the scanner according to the embodiment of the invention in which an upper unit is opened with respect to a lower unit.
Figure 4:
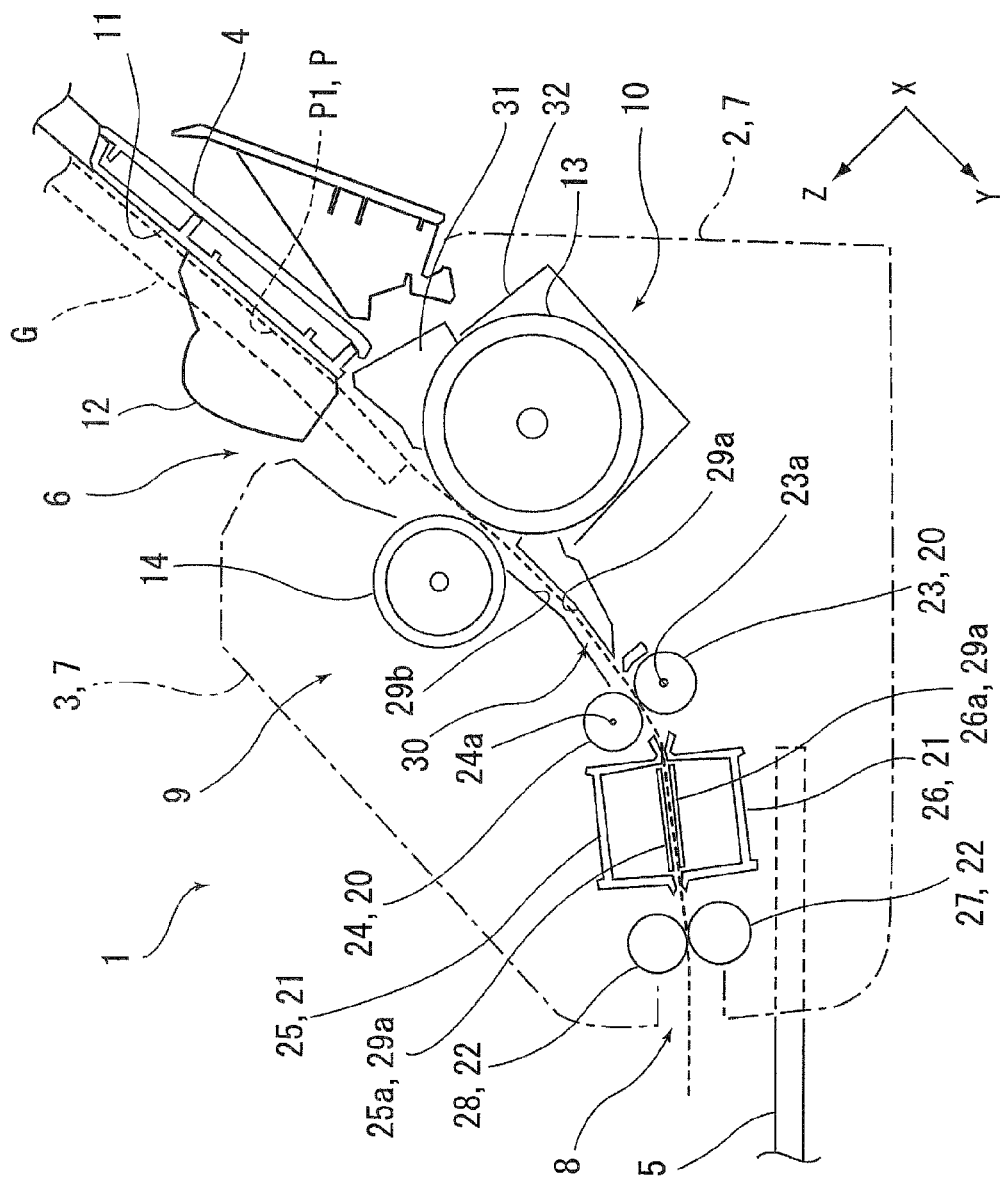
FIG. 4 is a side cross-sectional view of a transport path in the scanner according to the embodiment of the invention.
Figure 5:
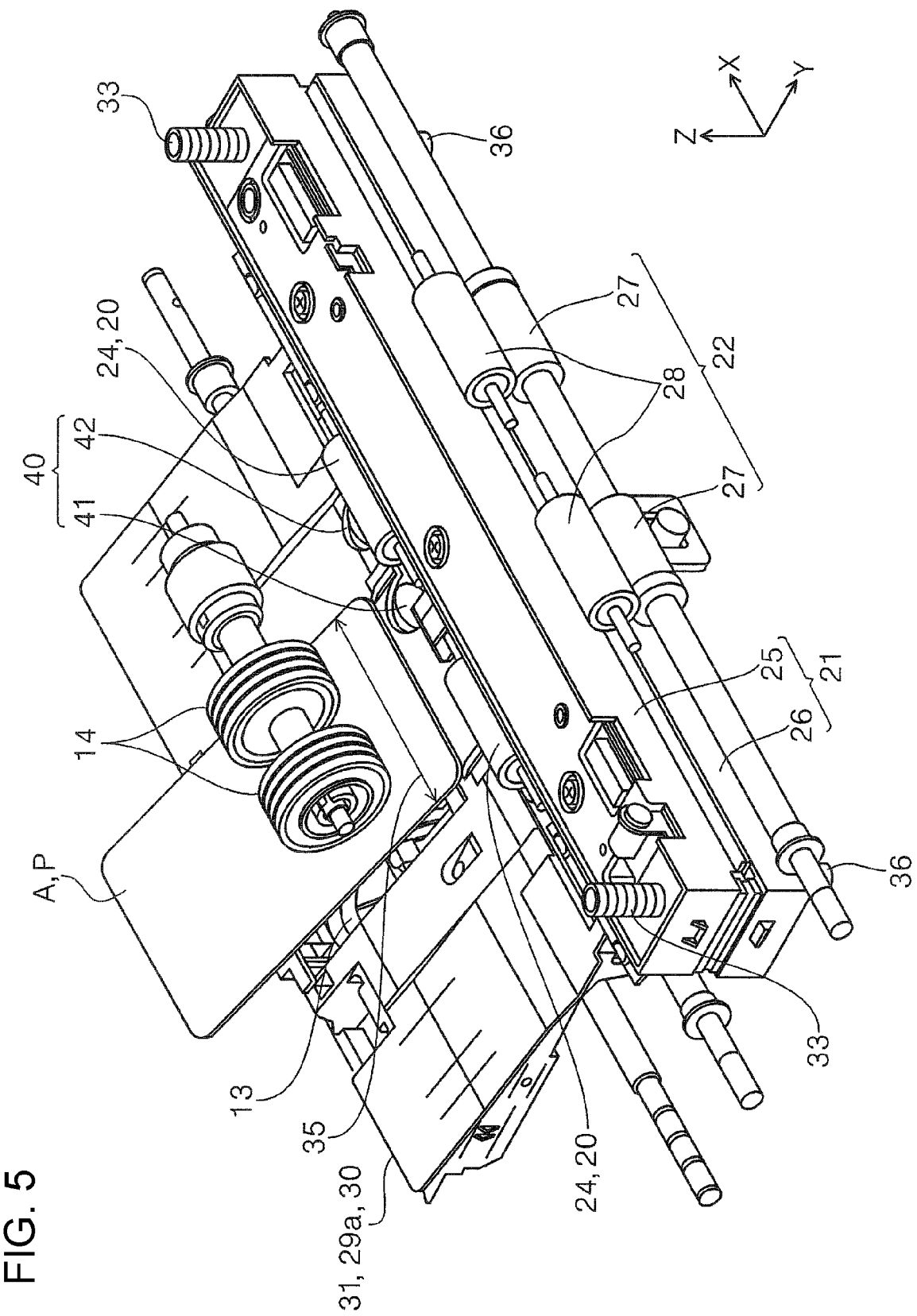
FIG. 5 is a perspective view of the main components of the scanner.
Figure 6:
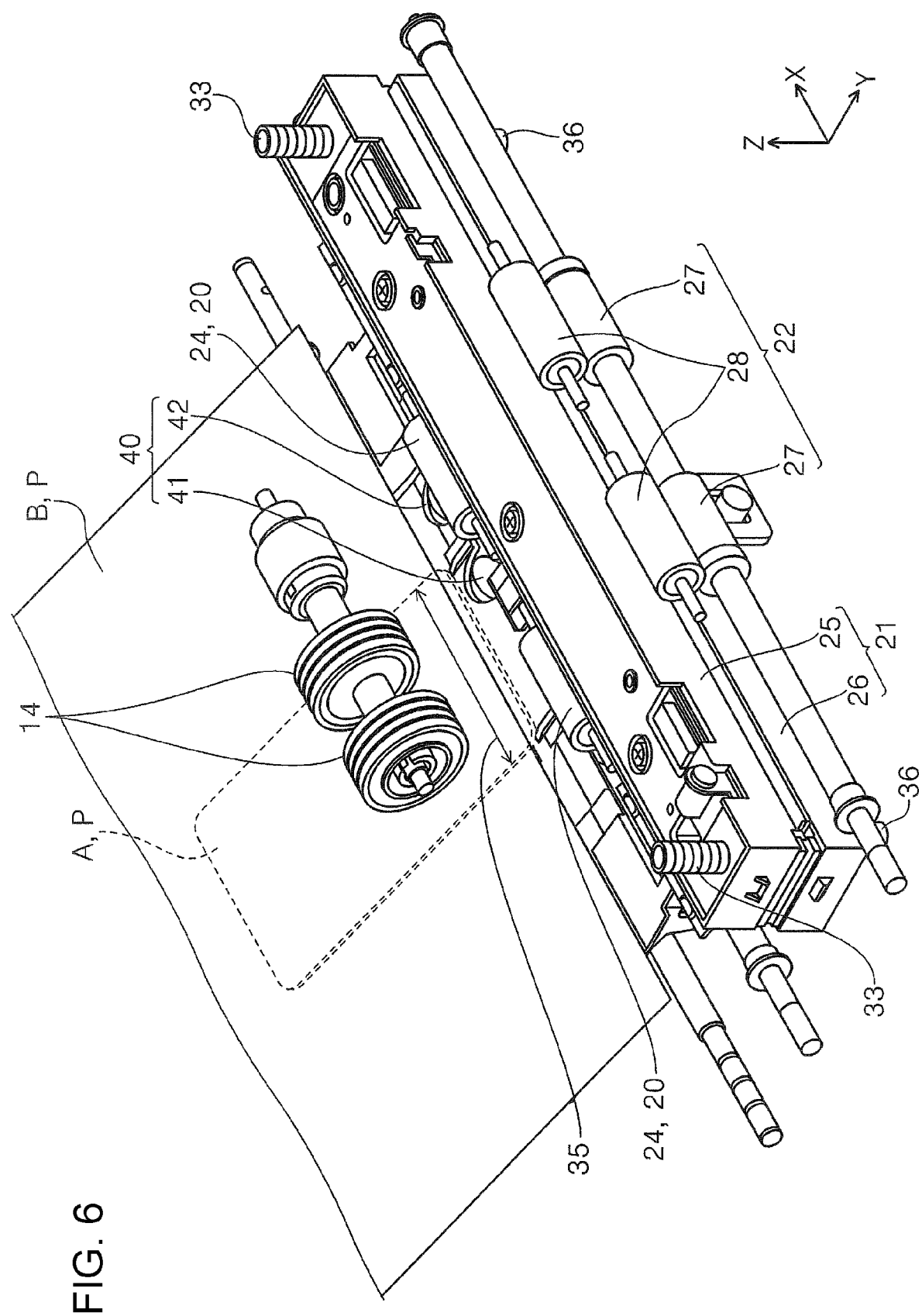
FIG. 6 is a perspective view of the main components of the scanner.
Figure 7:
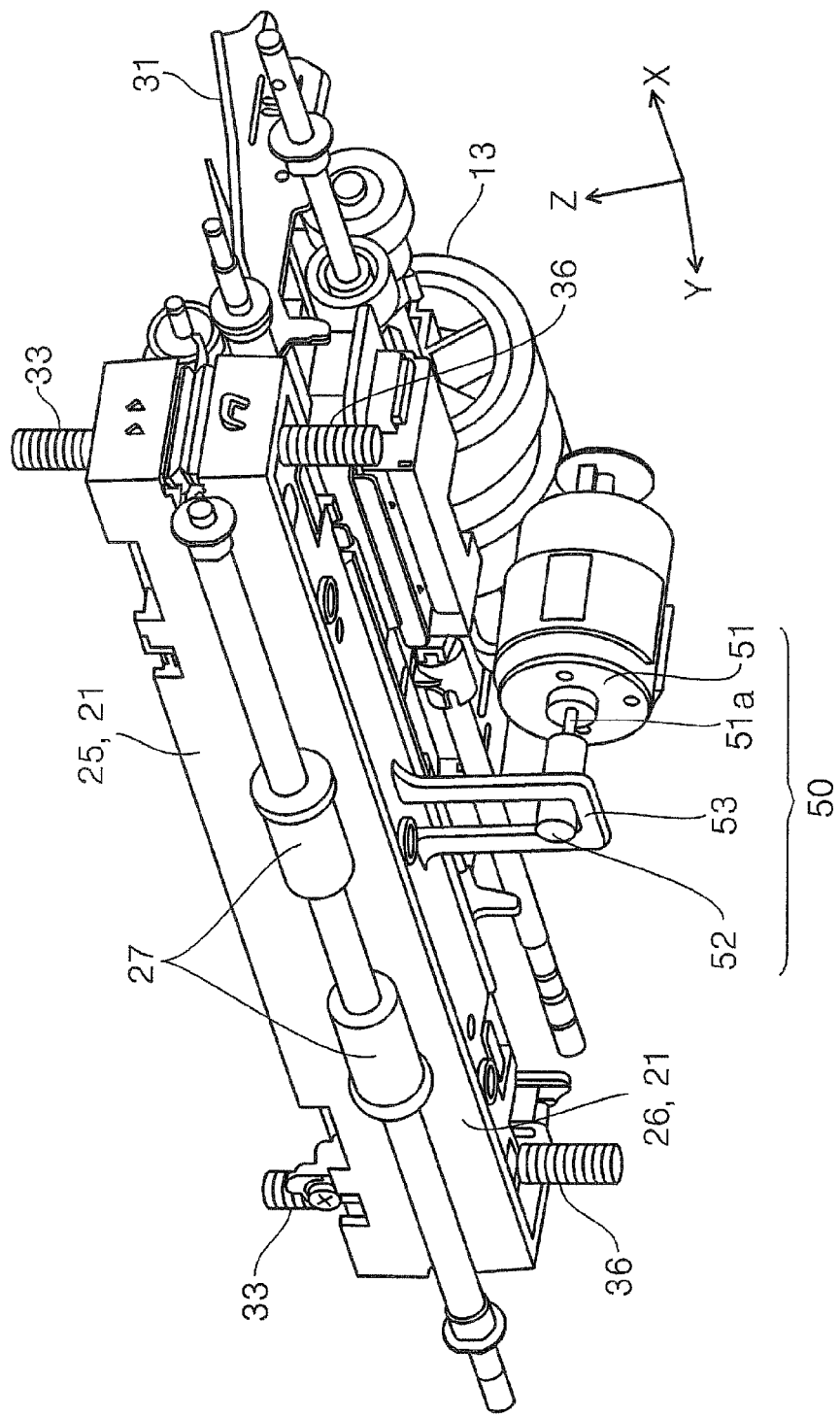
FIG. 7 is a perspective view of the main components of the scanner viewed from the lower side.
Figure 8:
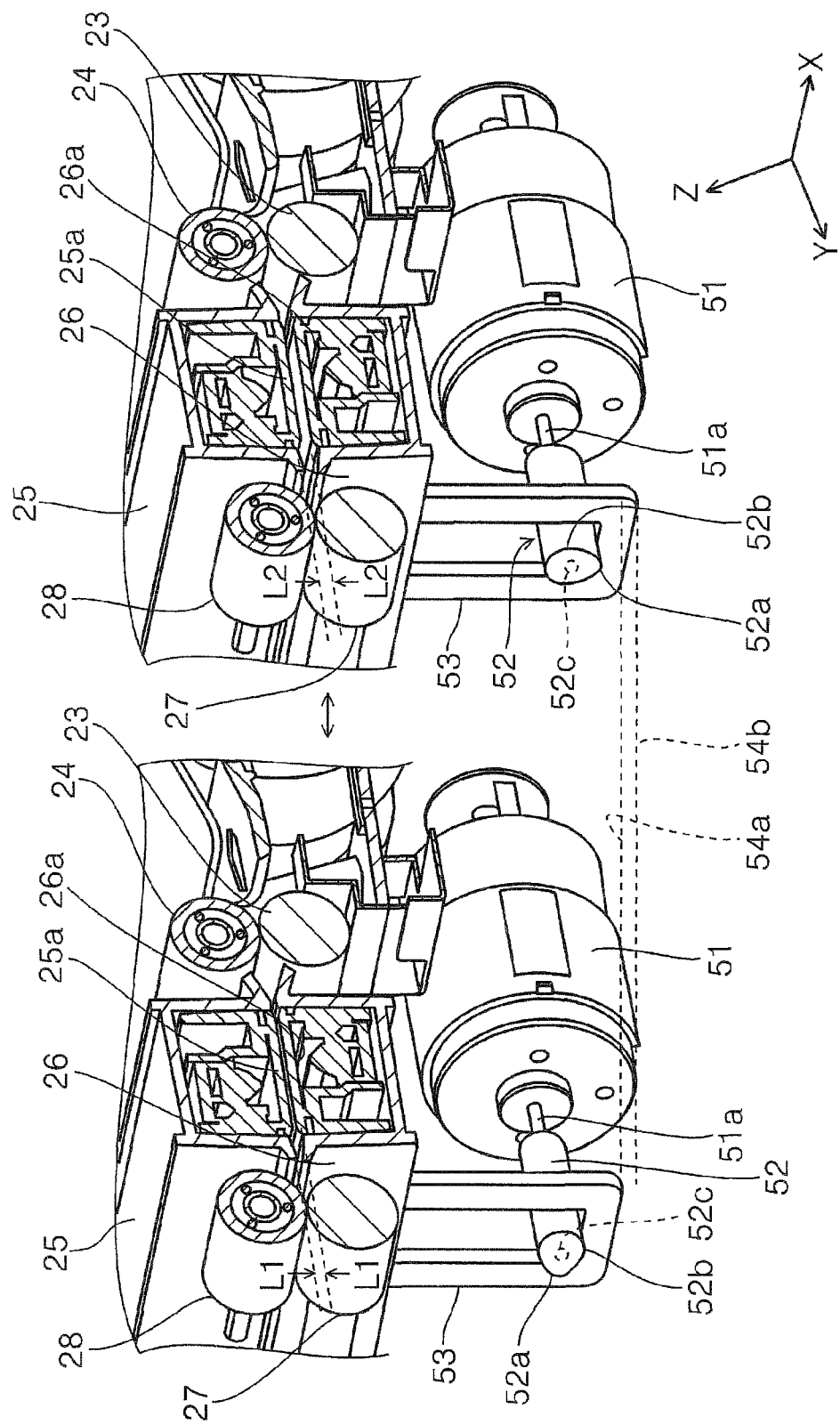
FIG. 8 illustrates switching of positions of a lower read sensor.
Figure 9:
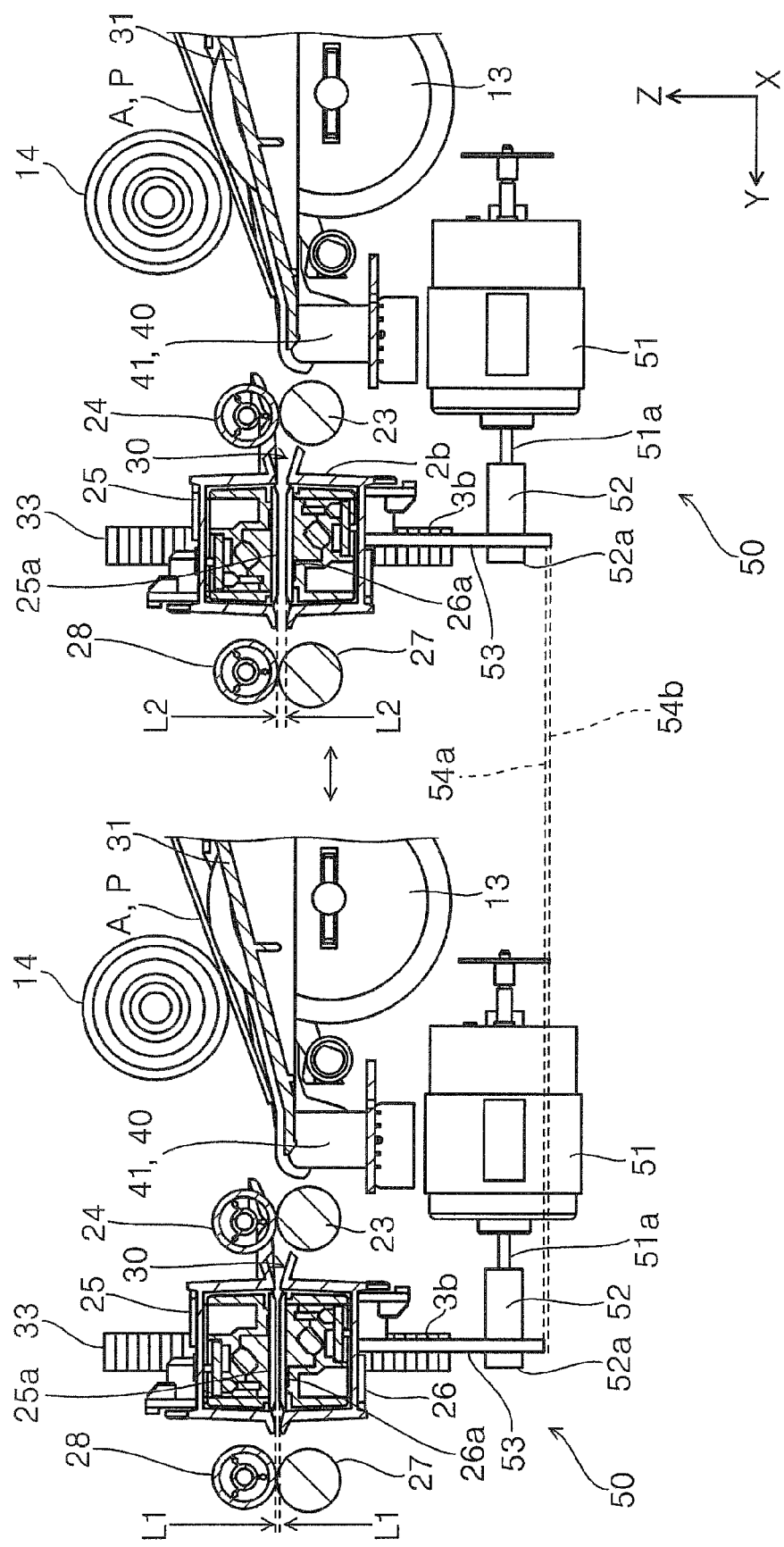
FIG. 9 illustrates switching of positions of the lower read sensor.
Figure 10:
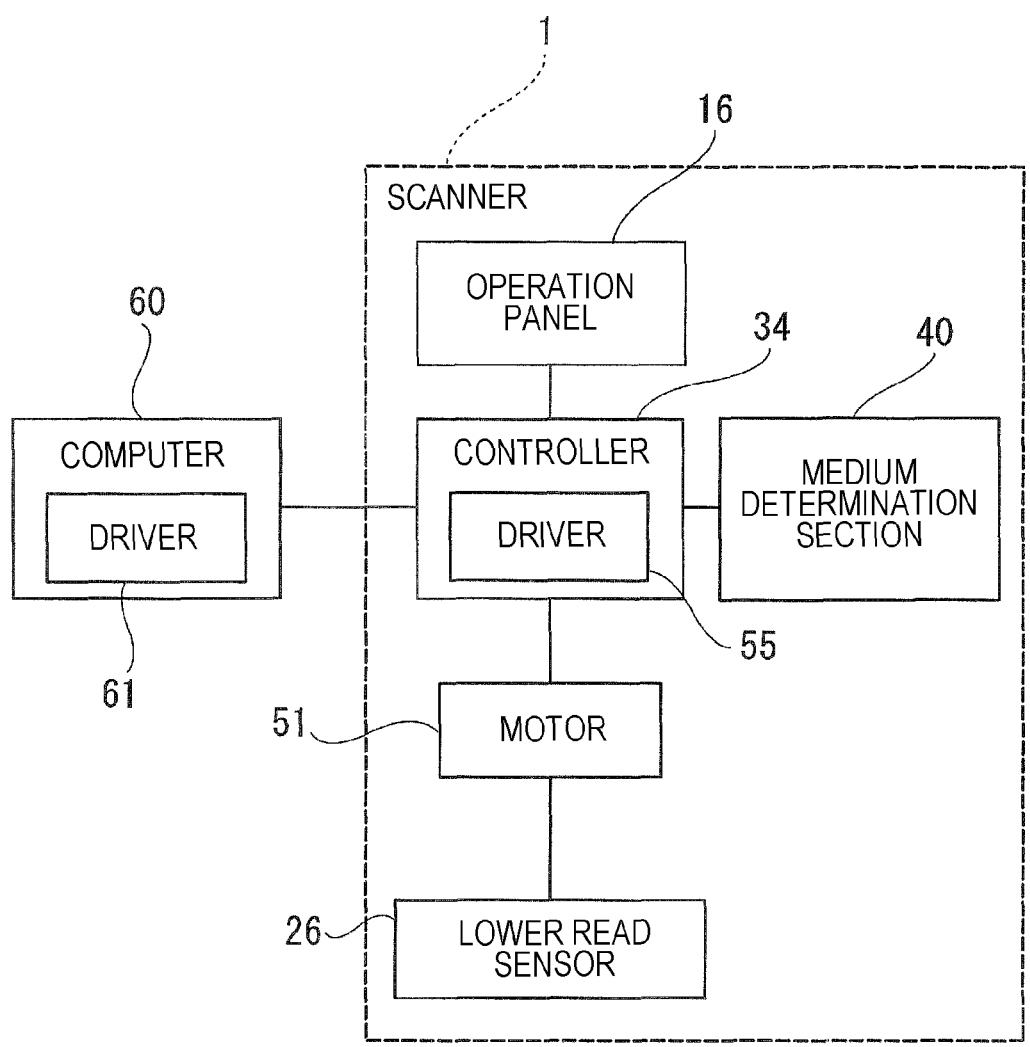
FIG. 10 is a block diagram of a control system in the scanner.

FIG. 1 is an external perspective view of the scanner according to the embodiment of the invention. FIG. 2 is a perspective view of the scanner according to the embodiment of the invention in which an opening/closing body is opened and a discharge tray is extended. FIG. 3 is a perspective view of the scanner according to the embodiment of the invention in which an upper unit is opened with respect to a lower unit. FIG. 4 is a side cross-sectional view of a medium transport path in the scanner according to the embodiment of the invention. FIG. 5 is a perspective view of the main components of the scanner. FIG. 6 is a perspective view of the main components of the scanner. FIG. 7 is a perspective view of the main components of the scanner viewed from the lower side. FIG. 8 illustrates switching of positions of the lower read sensor. FIG. 9 illustrates switching of positions of the lower read sensor. FIG. 10 is a block diagram of a control system in the scanner.

Overview of the Scanner

The scanner 1 (FIG. 1), which is an example image reading apparatus according to the embodiment of the invention, includes a housing 7 and a paper support 4, which form an appearance of the scanner 1. The housing 7 has a lower unit 2 and an upper unit 3. The paper support 4 is an opening/closing body to be opened or closed with respect to an upper surface of the upper unit 3.

In the XYZ coordinate system in the drawings, the X direction denotes an apparatus width direction, that is, a sheet width direction, and the Y direction denotes a sheet transport direction. The Z direction intersects the Y direction and is approximately orthogonal to a surface of a sheet that is being transported. Furthermore, the +Y direction side denotes an apparatus front side, and the −Y direction side denotes an apparatus back side. The right side viewed from the apparatus front side is the +X direction and the left side is the −X direction. The +Z direction side denotes an apparatus upper side (including upper sections, upper surfaces, and the like), and the −Z direction side denotes an apparatus lower side (including lower sections, lower surfaces, and the like). In the scanner 1, a medium is to be transported in the +Y direction in the drawings. The +Y direction side denotes a "downstream side", and the −Y direction side denotes an "upstream side".

The upper unit 3 is rotatably attached to the lower unit 2 about its downstream side (+Y side) in the medium transport direction with respect to the lower unit 2. The upper unit 3 can be switched to a closed position (see FIG. 2) in which the upper unit 3 is closed with respect to the lower unit 2 to form a transport path 30 (FIG. 3 and FIG. 4) for a medium P together with the lower unit 2 or switched to an open position (FIG. 3) in which the upper unit 3 is rotated toward the apparatus front side with respect to the lower unit 2 to expose the transport path 30 for the medium P to enable a user to readily perform maintenance such as removing a jammed medium P.

A paper support 4 (FIG. 2) that can be opened or closed with respect to the upper unit 3 is provided on an upper section of the upper unit 3. The paper support 4 can be switched to a non-feeding position in which the paper support 4 covers the upper section of the upper unit 3 as illustrated in FIG. 1 and a feed opening 6 (FIG. 2) or switched to a feeding position in which the paper support 4 is rotated from the non-feeding position in FIG. 1 to the apparatus back side in FIG. 2 to expose the feed opening 6 to enable a user to set a medium P on the back surface (a medium mounting section 11 for a medium P) of the paper support 4. In the feeding position, the paper support 4 can support a plurality of sheets of the media P (medium bundle G in FIG. 4) on the medium mounting section 11. On the upstream side of the paper support 4, an auxiliary paper support 15 (FIG. 2 and FIG. 3) that can be extended and retracted with respect to the paper support 4 is provided.

A discharge port 8 for discharging a medium P is provided on the apparatus front side of the lower unit 2. The lower unit 2 includes a discharge tray 5 that can be extended from the discharge port 8 toward the apparatus front side. The discharge tray 5 can be switched between a position (see FIG. 1) in which the discharge tray 5 is retracted into the bottom section of the lower unit 2 and a position (see FIG. 2) in which the discharge tray 5 is extended toward the apparatus front side. In this embodiment, the discharge tray 5 has a plurality of tray members that are connected to each other and the length from the discharge port 8 can be adjusted depending on the length of the medium P to be discharged.

An operation panel 16 is provided on the apparatus front surface. The operation panel 16 includes operation buttons to be used to perform various reading setting operations and execute a reading operation and a display section to be used to display the reading setting content.

The Transport Path in the Scanner

The transport path in the scanner 1 will be described mainly referring to FIG. 4. To load a medium P into the feed opening 6, the medium P is mounted on the medium mounting section 11. In the feed opening 6, a medium bundle G (medium bundle) that consists of overlapped sheets of the media P can be mounted. A pair of edge guides 12 in FIG. 4 (also see FIG. 2 and FIG. 3) guide both ends of the medium P in the width direction (X-axis direction). The edge guides 12 can be slid in the X-axis directions in accordance with the size of the medium P.

The medium bundle G loaded into the feed opening 6 is fed by a feeding device 10 and transported toward an image reading section 21, which will be described below. The feeding device 10 includes feeding rollers 13 that come into contact with a lowermost medium P1 of the medium bundle G, which has been mounted on the medium mounting section 11, and rotate to feed the lowermost medium P1. The feeding rollers 13 can rotate with respect to the lower unit 2. More specifically, each feeding roller 13 is detachably attached to a recessed portion 32 in the lower unit 2 and the recessed portion 32 is covered with a cover member 31. The cover member 31 is a part of a lower guide surface 29a (an upper surface of the lower unit 2 in FIG. 3) of the transport path 30 and covers the recessed portion 32 while a part of the feeding rollers 13 is exposed in the transport path 30.

Separation rollers 14 for nipping paper with the feeding rollers 13 therebetween to separate the lowermost medium P1 from the medium bundle G are provided at positions opposite the feeding rollers 13. In this embodiment, the feeding rollers 13 and the separation rollers 14 are disposed almost in the central part in the apparatus width direction that intersects the medium transport direction, as illustrated in FIG. 3. On the medium mounting section 11, the media P are aligned in the central section in the width direction so as to be fed by so-called center paper feeding. Outer circumferential surfaces of the feeding rollers 13 and the separation rollers 14 are made of high-friction material, for example, an elastomer such as rubber.

The lowermost medium P1 (hereinafter, simply referred to as the medium P) is picked by the feeding rollers 13, which are rotatable with respect to the lower unit 2, and fed toward the downstream side (+Y direction side). Specifically, the feeding rollers 13 rotate while coming into contact with the surface of the medium P that faces the mounting surface of the medium mounting section 11 and thereby the medium P is fed toward the downstream side. Consequently, when the medium bundle G (a plurality of sheets of the media P) is loaded into the feed opening 6 in the scanner 1, the sheets are fed sequentially from the lowermost sheet toward the downstream side. The medium P fed by the feeding rollers 13 is transported on the transport path 30 on the downstream side of the feeding rollers 13. The transport path 30 has the lower guide surface 29a and an upper guide surface 29b that face each other.

Transport rollers 20 that serve as a "transport section" are disposed on the downstream side of the feeding rollers 13. The transport rollers 20 include a transport-driving roller 23 that is disposed in the lower unit 2 and transport-driven rollers 24 that are disposed in the upper unit 3 so as to rotate when driven by the transport-driving roller 23. A part of the transport-driving roller 23 protrudes from the lower guide surface 29a. The transport-driven rollers 24 are disposed such that their rotation shaft 24a is located at a position on the downstream side of a rotation shaft 23a of the transport-driving roller 23. With this structure, the medium P is transported while being pressed against the lower surface (specifically, a lower read surface 26a of a lower read sensor 26, which will be described below) of the transport path 30.

An image reading section 21 for reading an image is disposed on the downstream side of the transport rollers 20. The medium P is transported to the image reading section 21 by the transport rollers 20. The image reading section 21 includes an upper read sensor 25 that serves as an "upper read section" that is provided on the side of the upper unit 3 and a lower read sensor 26 that serves as a "lower read section" that is provided on the side of the lower unit 2. In this embodiment, as an example, the upper read sensor 25 and the lower read sensor 26 are formed as a contact image sensor (CIS) module. The configuration of the image reading section 21 (the upper read sensor 25 and the lower read sensor 26) will be described below.

In the image reading section 21, after an image of at least one of the front side and the back side of the medium P has been read, the medium P is transported by discharging rollers 22 that are disposed on the downstream side of the image reading section 21 and discharged from a discharge port 8 that is provided on the apparatus front side of the lower unit 2. The discharge rollers 22 include discharge driving rollers 27 that are disposed in the lower unit 2 and discharge driven rollers 28 that are disposed in the upper unit 3 so as to rotate when driven by the discharge driving roller 27. In the position the discharge tray 5 is extended (FIG. 2), the medium P that is discharged from the discharge port 8 is stacked on the discharge tray 5.

The Image Reading Section

With reference to FIG. 4 to FIG. 9, the upper read sensor 25 and the lower read sensor 26, which serve as the image reading section 21, will be described. In FIG. 4, the upper read sensor 25 includes an upper read surface 25a that is a part of the upper guide surface 29b of the transport path 30 and reads an image on the front side that is a "first side" of the medium P being transported and faces the upper read surface 25a. In FIG. 4, the lower read sensor 26 is disposed on the opposite side of the transport path 30 from the upper read sensor 25 and includes the lower read surface 26a that is a part of the lower guide surface 29a of the transport path 30 and reads an image on the back side that is a "second side" of the medium P being transported and faces the lower read surface 26a.

The upper read sensor 25 and the lower read sensor 26 extend in the apparatus width direction (X-axis direction) as illustrated in FIG. 5. The upper read sensor 25 is provided with spring members 33 that serve as an "urging member" at both end portions in the apparatus width direction. The spring members 33 are disposed between the upper read sensor 25 and the upper unit 3 (not illustrated in FIG. 5). In this embodiment, the upper read sensor 25 can be moved toward or away from the upper unit 3. The spring members 33 urge the upper read sensor 25 toward the lower read sensor 26.

The lower read sensor 26 can be switched between a forward position (the left figure in FIG. 8 and the left figure in FIG. 9) in which the lower read surface 26a is moved toward the upper read surface 25a and a rearward position (the right figure in FIG. 8 and the right figure in FIG. 9) in which the lower read surface 26a is moved away from the upper read surface 25a farther than the forward position. The switching of the lower read sensor 26 is controlled by a controller 34 (FIG. 10). The controller 34 switches the lower read sensor 26 between the forward position and the rearward position in accordance with the type of medium being transported. More specifically, when transporting a first medium A that has a predetermined stiffness as a medium P, the controller 34 switches the lower read sensor 26 to the rearward position and when transporting a second medium B that has a stiffness lower than that of the first medium A as the medium P, switches the lower read sensor 26 to the forward position.

The lower read sensor 26 is switched between the forward position and the rearward position by a position switching mechanism section 50, which will be described below. The structure of the position switching mechanism section 50 will be described below in detail.

In this embodiment, the first medium A, which has the predetermined stiffness, is a card-size medium as illustrated in FIG. 5, for example, a card made of resin such as plastic or a card-size thick paper sheet. The second medium B, which has the stiffness lower than that of the first medium A, is, for example, common plain paper such as a postcard that is larger than the card or an A4-size medium illustrated in FIG. 6.

The controller 34, which switches the lower read sensor 26 between the forward position and the rearward position in accordance with the type of medium being transported, achieves the following operational advantages. That is, when transporting the first medium A (card-size medium) as the medium P, which has a high stiffness, the controller 34 switches the lower read sensor 26 to the rearward position as illustrated in the right figure in FIG. 8 and the right figure in FIG. 9 to set the space between the upper read surface 25a of the upper read sensor 25 and the lower read surface 26a of the lower read sensor 26 to a wide space L2. This wide space reduces the risk of the first medium A being caught on the lower read surface 26a when the first medium A having a high stiffness is transported while being pressed against the lower surface of the transport path 30, that is, the lower read surface 26a of the lower read sensor 26, by the transport rollers 20. Furthermore, the increase in the transport resistance of the first medium A to the lower read surface 26a can be reduced.

When transporting the second medium B, which has the stiffness higher than that of the first medium A, as the medium P, the controller 34 switches the lower read sensor 26 to the forward position as illustrated in the left figure in FIG. 8 and the left figure in FIG. 9. Consequently, when transporting the second medium B which is less likely to be caught on the lower read surface 26a while being pressed against the lower read surface 26a, the controller 34 can set the space between the upper read surface 25a and the lower read surface 26a to a narrow space L1. Accordingly, the space between the upper read surface 25a and the front side of the second medium B and the space between the lower read surface 26a and the back side of the second medium B can be further narrowed respectively, and thereby the reading accuracy can be increased.

The scanner 1 includes a medium determination section 40 (FIG. 5 and FIG. 6) that determines whether the medium P being transported toward the image reading section 21 is the first medium A or the second medium B. The medium determination section 40 determines whether the medium P being transported is the first medium A or the second medium B, and in accordance with the determination result, the controller 34 controls the position of the lower read sensor 26. As a result of the determination by the medium determination section 40, if the position of the lower read sensor 26 is to be switched, the controller 34 can temporarily stop the medium P before the medium P reaches the image reading section 21 and switch the position of the lower read sensor 26.

Hereinafter, a specific structure of the medium determination section 40 according to this embodiment will be described. The medium determination section 40 includes a first sensor 41 and a second sensor 42. The first sensor 41 is disposed, in the transport path 30, inside a transport area 35, in which the card-size first medium A is to be transported, in a width direction (X-axis direction) that intersects the medium transport direction (+Y direction). The second sensor 42 is disposed, in the transport path 30, outside the transport area 35, in which the card-size first medium A is to be transported, in the width direction. The first sensor 41 and the second sensor 42 are disposed on the lower guide surface 29a side so as to detect the medium P when the medium P passes over the sensors respectively.

The medium determination section 40 determines that the medium P being transported is the first medium A when the medium P is detected by the first sensor 41 and not detected by the second sensor 42, and determines that the medium P is the second medium B in a case other than the above case.

The first sensor 41 and the second sensor 42 in the medium determination section 40, which are disposed respectively inside and outside the transport area 35, in which the card-size first medium A is to be transported, in the width direction, enable a reliable determination of whether the medium P is the first medium A or the second medium B.

It is preferable that the first sensor 41 and the second sensor 42 be multi-sheet feed detection sensors. The multi-sheet feed detection sensors are capable of detecting that two or more sheets of the second medium B, which are the media P, are fed in an overlapped state. When a single sheet of the second medium B is transported, the multi-sheet feed detection sensors do not detect a multi-sheet feed of the medium P. When both of the first sensor 41 and the second sensor 42 detect a multi-sheet feed of the second media B, which are larger than a card, it can be determined that a multi-sheet feed of the second media B occurs. When the first sensor 41 detects a multi-sheet feed and the second sensor 42 does not detect a multi-sheet feed, it can be determined that the medium P is the first medium A. Furthermore, when both the first sensor 41 and the second sensor 42 do not detect a multi-sheet feed, it can be determined that a single sheet of the second medium B is being transported normally. In both cases in which the second media B are in the multi-sheet feed state or in the normal transport state, the lower read sensor 26 is set to the forward position.

In this embodiment, ultrasonic sensors are used as the first sensor 41 and the second sensor 42. Each ultrasonic sensor includes a wave transmission section for emitting an ultrasonic wave toward the medium P and a wave reception section for receiving the reflection wave and detects a multi-sheet feed state of the second medium B by detecting the attenuation of the reflection wave. The ultrasonic sensor is capable of distinguish and detect a multi-sheet feed state and a normal transport state in which only a single sheet of the medium is being transported in accordance with the difference in the attenuation of the reflection wave. Such ultrasonic sensors enable the highly reliable detection of the multi-sheet feed of the media P at low cost. It should be noted that one of the first sensor 41 and the second sensor 42 may be the ultrasonic sensor. As an alternative to the ultrasonic sensor, a different type of multi-sheet feed detection sensor such as a lever-type sensor may be used.

In this embodiment, the first sensor 41 is disposed inside the transport area 35 in the width direction to transport the card-size first medium A such that its long side is transported along the transport direction (the position in FIG. 5), and the second sensor 42 is disposed outside the transport area 35 in the width direction to similarly transport the first medium A such that its long side is transported along the transport direction. The arrangement of the first sensor 41 and the second sensor 42 enables the sensors 41 and 42 to distinguish and detect the first medium A and the second medium B when the first medium A is transported with its long side along the transport direction.

Alternatively, the second sensor 42 may be disposed outside the transport area in the width direction to transport the first medium A such that its short side is transported along the transport direction, that is, in a state in which the first medium A in FIG. 5 is rotated by 90 degrees and transported. This arrangement enables the first sensor 41 and the second sensor 42 to distinguish and detect the first medium A and the second medium B in both of the case in which the card-size first medium A is transported with its long side along the transport direction and the case in which the first medium A is transported with its short side along the transport direction.

In this embodiment, the card-size medium is detected as the first medium A and the lower read sensor 26 is switched to the rearward position. Alternatively, among card-size medium, to use a relatively thin business card, the lower read sensor 26 may be switched to the forward position instead of the rearward position. That is, the lower read sensor 26 can be controlled in accordance with a determination that the card-size business card is the second medium B. In such a case, for example, a sensor capable of measuring the thickness of a medium may be used to distinguish and detect a resin card or a card of thick paper that have a predetermined thickness or more and a business card that is thinner than the predetermined thickness. When the sensor capable of measuring the thickness of a medium is used as the first sensor 41, the second sensor 42 may be omitted.

The Position Switching Mechanism Section in the Lower Read Sensor

Next, the position switching mechanism section 50 that switches the lower read sensor 26 between the forward position and the rearward position will be described. As illustrated in FIG. 7, the position switching mechanism section 50 includes a motor 51 that serves as a "drive source" and a cam section 52 that transforms a driving force of the motor 51 into forward or rearward motion of the lower read sensor 26. The cam section 52 is provided at an end of a shaft 51*a* of the motor 51 and rotates in response to driving of the motor 51. The cam section 52 (FIG. 8) includes a convex portion 52*a* that is farther from a rotation center 52*c* and an arc portion 52*b* that is closer to the rotation center 52*c* and the cam section 52 engages with an engaging portion 53 that is disposed below the lower read sensor 26.

As illustrated in FIG. 7, the lower read sensor 26 includes spring members 36 at both end portions in the apparatus width direction. The spring members 36 are disposed between the lower read sensor 26 and the lower unit 2 (not illustrated in FIG. 7). The lower read sensor 26 can be moved toward or away from the lower unit 2. The spring members 36 urge the lower read sensor 26 against the upper read sensor 25.

As illustrated in the left figure in FIG. 8 and the left figure in FIG. 9, in a state in which the arc portion 52*b* of the cam section 52 is positioned in the −Z direction and in contact with the engaging portion 53, the lower read sensor 26 is in the forward position. In this state, a lower end of the engaging portion 53 is located at a position 54*a* and the space between the upper read surface 25*a* and the lower read surface 26*a* is the narrow space L1.

To switch the lower read sensor 26 to the rearward position, the controller 34 drives the motor 51 to rotate the shaft 51*a*. As illustrated in the right figure in FIG. 8 and the right figure in FIG. 9, when the convex portion 52*a* of the cam section 52 is positioned in the −Z direction and in contact with the engaging portion 53, the lower read sensor 26 is lowered against the urging force of the spring members 36. In this state, the lower end of the engaging portion 53 is located at a position 54*b*, and the space between the upper read surface 25*a* and the lower read surface 26*a* becomes the space L2 that is widened by the amount the lower read sensor 26 is lowered.

To switch the lower read sensor 26 from the rearward position to the forward position, the controller 34 drives the motor 51 to rotate the shaft 51*a* to return the position of the arc portion 52*b* of the cam section 52 to the position illustrated in the left figure in FIG. 8 and the left figure in FIG. 9, and thereby the lower read sensor 26 is urged by the spring members 36 and switched to the forward position. Such a position switching mechanism section 50 simplifies the structure and enables the switching of the positions of the lower read sensor 26.

The Controller

As described above, the controller 34 that switches the positions of the lower read sensor 26 makes a determination by using the medium determination section 40 and in accordance with a determination result, controls the position of the lower read sensor 26. Furthermore, the controller 34 can control the position of the lower read sensor 26 in accordance with the type of medium P that has been set in a driver 55 (FIG. 10). As illustrated in FIG. 10, the scanner 1 that includes the controller 34 acquires the setting (the first medium A or the second medium B) of the type of the medium P via the driver 55 and in accordance with the information, the controller 34 drives the motor 51 of the position switching mechanism section 50. The type of medium P can be set via an operation panel 16. It should be noted that the information of the type of medium P can be acquired via a driver 61 that has been installed on a computer 60 that is connected to the scanner 1.

When the type of medium P that has been set in the driver 55 (or the driver 61) differs from that determined by the medium determination section 40, it is preferable that the controller 34 control the position of the lower read sensor 26 in accordance with the determination result of the medium determination section 40. Prioritizing the determination of the medium determination section 40 can avoid the use of a wrong setting that has been made by the user. In prioritizing the determination of the medium determination section 40, it is preferable that the transport of the medium P be temporarily stopped before the medium P reaches the image reading section 21 and the user be notified that the setting in the driver 55 and the determination result of the medium determination section 40 are different, for example, by displaying the information on the operation panel 16. In such a case, the user may select whether to prioritize the determination result of the medium determination section 40 or to prioritize the setting in the driver.

The position of the lower read sensor 26 may be controlled in accordance with settings in the driver 55 without providing the medium determination section 40 in the scanner 1. In such a case, for example, the position of the lower read sensor 26 may be switched prior to the transport of the medium P from the medium mounting section 11 to transport the medium P without temporarily stopping it before the medium P reaches the image reading section 21. It should be noted that the position of the lower read sensor 26 may be switched after the medium P is temporarily stopped before the medium P reaches the image reading section 21.

The Lower Read Sensor

The lower read sensor 26 may be configured to be in a second rearward position in which the lower read sensor 26 is moved away from the upper read sensor 25 than the rearward position illustrated in the right figure in FIG. 8 and the right figure in FIG. 9, that is, moved downward, when the upper unit 3 is opened. As described above, the upper unit 3 is opened or closed with respect to the lower unit 2, and when the upper unit 3 is switched to the open position as illustrated in FIG. 3, the transport path 30 is exposed to allow a user to perform maintenance such as removing a paper jam of the medium P or replacing various rollers. The lower read sensor 26 that is moved further downward prevents a user from touching the lower read surface 26*a* of the lower read sensor 26 or foreign matter from coming into contact with the lower read surface 26*a* when the upper unit 3 is opened for maintenance or other operations.

The Upper Read Sensor

As described above, the upper read sensor 25 can be moved toward or away from the lower unit 2 and can be urged toward the lower read sensor 26 by the spring members 33. The spring members 33 may be configured such that the urging force can be adjusted, and the urging force may be controlled by the controller 34. To transport the first medium A as the medium P, the controller 34 sets the urging force of the spring members 33 to a large force and to transport the second medium B as the medium P, sets the urging force of the spring members 33 to an urging force smaller than that for transporting the first medium A.

While being transported, the first medium A having the high stiffness may come into contact with the upper read sensor 25 and may move the upper read sensor 25. The movement of the upper read sensor 25 during the operation of reading the document decreases the read image quality. Consequently, to transport the first medium A, the urging force of the spring members 33 may be set to a large urging force to reduce the risk of the upper read sensor 25 moving due to the contact of the first medium A.

On the other hand, the second medium B that has the stiffness lower than that of the first medium A less frequently moves the upper read sensor 25 even if the second medium B comes into contact with the upper read sensor 25 during the transport. Consequently, to transport the second medium B as the medium, the urging force of the spring members 33 is set to an urging force smaller than that for transporting the first medium A. This adjustment reduces the transport load in transporting the second medium B. The adjustment of the urging force of the spring members 33 may be performed, for example, by using a structure similar to the position switching mechanism section 50 described above, that is, by using a motor and an eccentric cam that are disposed such that the eccentric cam is in contact with upper ends of the spring members 33 and by rotating the eccentric cam to adjust the length of the spring members 33.

It is to be understood that the invention is not limited to the above-described embodiment, various modifications can be made within the scope of the following claims, and these modifications are included within the scope of the invention.

The entire disclosure of Japanese Patent Application No. 2016-154597, filed Aug. 5, 2016 is expressly incorporated by reference herein.

What is claimed is:

1. An image reading apparatus comprising,
a transport path on which a medium is to be transported;
a transport section configured to transport the medium while pressing the medium against a lower surface of the transport path;
an upper read section disposed on a downstream side of the transport section in the transport direction, the upper read section having an upper read surface that is a part of an upper surface of the transport path and being configured to read an image of a first side of the medium being transported, the first side facing the upper read surface;
a lower read section disposed on an opposite side of the transport path from the upper read section, the lower read section having a lower read surface that is a part of a lower surface of the transport path and being configured to read an image of a second side of the medium being transported, the second side facing the lower read surface;
wherein the lower read section can be switched between a forward position in which the lower read surface is moved toward the upper read surface and a rearward position in which the lower read surface is moved away from the upper read surface farther than the forward position, and
a controller configured to control the position of the lower read section,
wherein the controller switches the lower read section to the rearward position to transport a first medium having a predetermined stiffness as the medium and switches the lower read section to the forward position to transport a second medium having a stiffness lower than that of the first medium as the medium,
wherein the upper read section can be moved toward or away from the lower read section and includes an urging section configured to urge the upper read section toward the lower read section,
wherein the urging section is configured such that the urging force can be adjusted by the controller, and the controller that adjusts the urging force of the urging section sets the urging force of the urging section to a large force to transport the first medium as the medium and sets the urging force of the urging section to an urging force smaller than that for transporting the first medium to transport the second medium as the medium.

2. The image reading apparatus according to claim 1, further comprising:
a medium determination section configured to determine whether the medium being transported is the first medium or the second medium.

3. The image reading apparatus according to claim 2, further comprising:
a position switching mechanism section configured to switch the positions of the lower read section,
wherein the position switching mechanism section comprises a drive source and a cam section configured to transform the driving force of the drive source into forward or rearward motion of the lower read section.

4. The image reading apparatus according to claim 2, wherein the controller is capable of controlling the position of the lower read section in accordance with the type of medium that has been set in a driver and controls the position of the lower read section in accordance with a determination result by the medium determination section if the type of medium that has been set in the driver and the type of medium determined by the medium determination section are different.

5. The image reading apparatus according to claim 1, wherein the first medium is a card-size medium.

6. The image reading apparatus according to claim 5, wherein the medium determination section comprises:
a first sensor; and
a second sensor,
wherein both the first and the second sensors are placed parallel in the transport path, and the first sensor is configured to detect a card-sized medium and the second sensor is configured to detect a medium wider than a card-sized medium, such that a card-sized medium can only be detected by the first sensor, and a medium wider than a card-sized medium can be detected by both the first and the second sensors, and
the medium determination section determines that the medium is the first medium when the medium being transported is detected by the first sensor and not detected by the second sensor and determines that the medium is the second medium in other cases.

7. The image reading apparatus according to claim 6, wherein the first sensor is configured to detect the card-sized medium when a long (length) side of the card-sized medium is fed into an end of the transport path, and the second sensor is configured to detect a medium with a width greater than the length of the card-sized medium.

8. The image reading apparatus according to claim 6, wherein the first sensor is configured to detect the card-sized medium when a side of the card-sized medium is fed into an end of the transport path, and the second sensor is configured to detect a medium with a width greater than the width of the card-sized medium.

9. The image reading apparatus according to claim 6, wherein at least one of the first sensor and the second sensor is an ultrasonic sensor.

10. The image reading apparatus according to claim 1, wherein the controller is capable of controlling the position of the lower read section in accordance with the type of medium that has been set in a driver.

11. The image reading apparatus according to claim 1, further comprising:
a lower unit including the lower read section; and
an upper unit including the upper read section, the upper unit being configured to be opened or closed with respect to the lower unit,
wherein when the upper unit is opened, the lower read section can be switched to a second rearward position in which the lower read section is farther moved rearward than the rearward position.

12. An image reading apparatus comprising:
a transport path on which a medium is to be transported;
a transport section configured to transport the medium while pressing the medium against a lower surface of the transport path;
an upper read section disposed on a downstream side of the transport section in the transport direction, the upper read section having an upper read surface that is a part of an upper surface of the transport path and being configured to read an image of a first side of the medium being transported, the first side facing the upper read surface;
a lower read section disposed on an opposite side of the transport path from the upper read section, the lower read section having a lower read surface that is a part of a lower surface of the transport path and being configured to read an image of a second side of the medium being transported, the second side facing the lower read surface,
wherein the lower read section can be switched between a forward position in which the lower read surface is moved toward the upper read surface and a rearward position in which the lower read surface is moved away from the upper read surface farther than the forward position, and the upper read section can be moved toward or away from the lower read section and includes an urging section configured to urge the upper read section toward the lower read section;
a controller configured to control the position of the lower read section,
wherein the controller switches the lower read section to the rearward position to transport a first medium having a stiffness that is at least as high as a predetermined stiffness as the medium and switches the lower read section to the forward position to transport a second medium having a stiffness lower than the predetermined stiffness as the medium, and
the controller is configured to adjust the urging force of the urging section, when the first medium is transported, the urging force of the urging section is adjusted to a first urging force; when the second medium is transported, the urging force of the urging section is adjusted to a second urging force; and the first urging force being greater than the second urging force.

* * * * *